A. SAFLEY.

Wheel Harrow.

No. 42,408.

Patented Apr. 19, 1864.

UNITED STATES PATENT OFFICE.

ANDREW SAFLEY, OF MOUNT VERNON, IOWA.

IMPROVEMENT IN HARROWS.

Specification forming part of Letters Patent No. 42,408, dated April 19, 1864.

*To all whom it may concern:*

Be it known that I, ANDREW SAFLEY, of Mount Vernon, in the county of Linn and State of Iowa, have invented a new and Improved Harrow; and I do hereby declare that the following is a full, clear, and exact description of the same, reference being had to the accompanying drawings, forming a part of this specification, in which—

Figure 1:
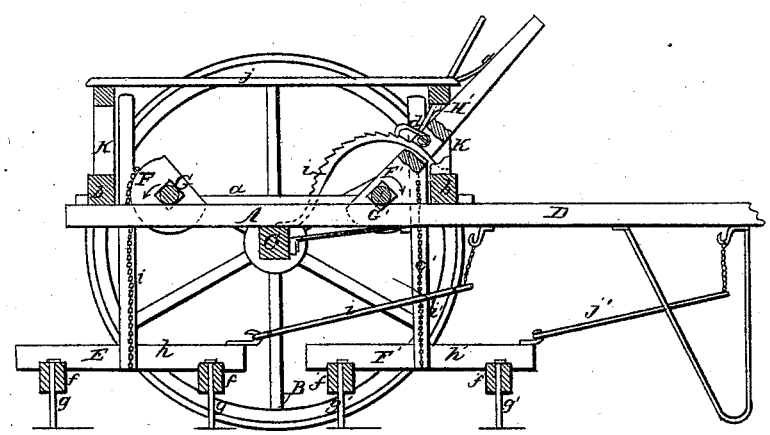
Figure 2:
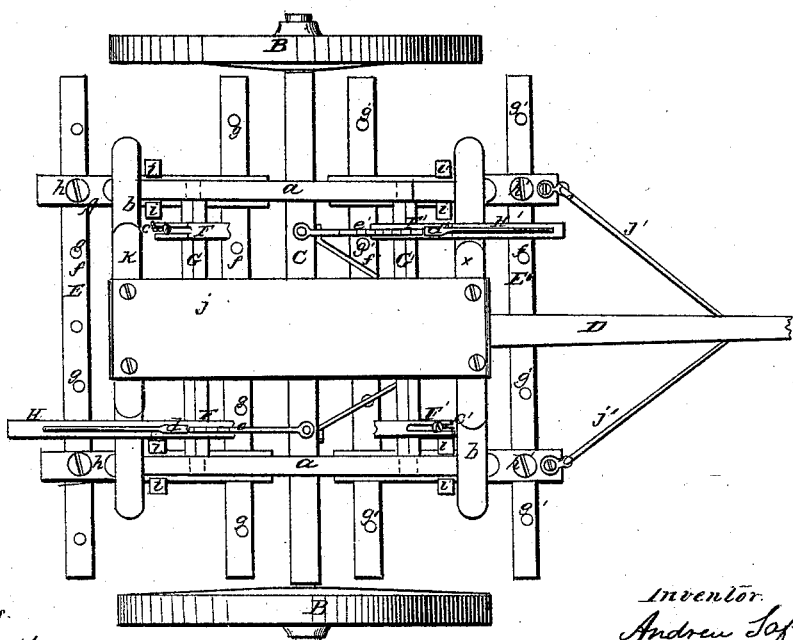

Figure 1 represents a longitudinal vertical section of this invention. Fig. 2 is a plan or top view of the same.

Similar letters of reference in both views indicate corresponding parts.

This invention consists in the arrangement of two vertically-adjustable harrows guided by vertical bars and suspended from a frame, which is supported by two wheels in such a manner that said harrows are brought close to the team, and thereby the draft is rendered lighter than with ordinary harrows, that either harrow can be raised or lowered independent of the other and adjusted to any desired depth, and that each harrow is correctly guided and kept square to the team, causing each tooth to do its work in the proper place, and, furthermore, by the arrangement of a long seat on the frame, so that the driver is able to move back or forward, the weight bearing on the tongue and neck-yoke can be regulated.

To enable those skilled in the art to make and use my invention, I will proceed to describe it.

A represents a frame made of wood or any other suitable material and constructed of two longitudinal timbers, *a*, which are connected in front and rear by cross-bars *b*, as clearly shown in Fig. 2 of the drawings. This frame is supported by the axle C of two wheels, B, and a draft-pole, D, serves to draw said frame and its appendages along over the ground in any desired direction.

E E' are two harrows, which are suspended by means of chains *c c'* from semicircular grooved segments F F', that are firmly secured to rock-shafts G G'. These rock-shafts have their bearings in the longitudinal timbers *a* of the frame A, and they are provided with hand-levers H H', so that they can be turned in either direction. By turning the rock-shaft G in the direction of the arrow marked near it in Fig. 1, the chains *c* are wound off from the segments F, and the harrow E is lowered, and by turning the rock-shaft G' in the direction of the arrow marked near it in the same figure, the harrow E' is lowered, and by turning said rock-shaft in the opposite direction of the arrows marked near them the harrows are raised from the ground. Each harrow can thus be raised or lowered independent of the other, and one harrow may be thrown out of the ground to clear an obstruction, while the other remains in the ground.

The hand-levers H H are provided with spring-dogs *d d'*, which catch in the teeth of serrated bars *e e'*, and by the action of said bars and dogs the levers and harrows can be adjusted and retained in any desired position.

The harrows E E' are composed each of two bars or heads, *f* or *f'*, which carry the teeth *g g'*, and which are connected by cross-bars *h h'*, respectively. From each of the cross-bars *h* and *h'* rise two guide-bars, *i i'*, which straddle the longitudinal timbers *a* of the frame A and prevent the harrows swaying to and fro in a lateral direction. Each tooth is thus compelled to keep its proper course and to do its work just in the place where it is required. The two sections E E' of the harrow connect with the draft-pole D by draft-rods *j j'*, which extend from said pole in two branches toward the cross-bars *h* and *h'*, connecting the heads *f* and *f'* of said harrows. By this arrangement of the draft-rods the harrows are kept square with the team, and, furthermore, the draft is carried forward close to the team, and thereby the strain is reduced.

J is the driver's seat, which is supported by standards *k*, rising from the rear and front cross-bars, *b*, of the frame A. By having the seat extending from one end of the frame to the other the driver is enabled to regulate the weight on the tongue and neck-yoke at pleasure.

This harrow is very cheap in its construction, and it is convenient and easy in its operation.

What I claim as new, and desire to secure by Letters Patent, is—

1. The combination of the two vertically-adjustable harrows E E, the guide-bars *i i'*, attached thereto, the draft-rods *j j'*, frame A, and wheels B B, all as herein shown and described.

2. In combination with the above, the rotary segments F F', hand-levers H H', spring-dogs *d d'*, serrated bars *e e'*, and chains *c c'*, all constructed and operating in the manner and for the purpose specified.

Witnesses:       ANDREW SAFLEY.
ANDREW J. MCKEAN,
J. K. GIBSON.